(12) United States Patent
Huang et al.

(10) Patent No.: US 12,548,829 B2
(45) Date of Patent: Feb. 10, 2026

(54) BATTERY

(71) Applicant: EVE POWER CO., LTD., Hubei (CN)

(72) Inventors: Liming Huang, Hubei (CN);
Liangliang Yue, Hubei (CN); Jing Liu, Hubei (CN); Yuebin Xu, Hubei (CN);
Wei He, Hubei (CN)

(73) Assignee: EVE POWER CO., LTD., Hubei (CN)

( * ) Notice: Subject to any disclaimer, the term of this patent is extended or adjusted under 35 U.S.C. 154(b) by 203 days.

(21) Appl. No.: 18/013,939

(22) PCT Filed: May 20, 2022

(86) PCT No.: PCT/CN2022/094102
§ 371 (c)(1),
(2) Date: Dec. 30, 2022

(87) PCT Pub. No.: WO2022/242744
PCT Pub. Date: Nov. 24, 2022

(65) Prior Publication Data
US 2024/0072343 A1 Feb. 29, 2024

(30) Foreign Application Priority Data
May 21, 2021 (CN) .......................... 202121100856.8

(51) Int. Cl.
*H01M 50/152* (2021.01)
*H01M 50/107* (2021.01)
(Continued)

(52) U.S. Cl.
CPC ....... *H01M 50/152* (2021.01); *H01M 50/107* (2021.01); *H01M 50/169* (2021.01); *H01M 50/531* (2021.01); *H01M 50/545* (2021.01)

(58) Field of Classification Search
CPC ............. H01M 50/152; H01M 50/107; H01M 50/531; H01M 50/545; H01M 50/169
See application file for complete search history.

(56) References Cited

U.S. PATENT DOCUMENTS

| | | | |
|---|---|---|---|
| 6,190,803 B1 * | 2/2001 | Tomiyama | H01M 10/0587 429/231.95 |
| 2007/0020518 A1 * | 1/2007 | Bito | H01M 50/536 29/623.2 |

(Continued)

FOREIGN PATENT DOCUMENTS

| | | |
|---|---|---|
| CN | 208507853 U | 2/2019 |
| CN | 109904380 A | 6/2019 |

(Continued)

OTHER PUBLICATIONS

KR-20080034221MT (Year: 2008).*
(Continued)

*Primary Examiner* — Alexander Usyatinsky
(74) *Attorney, Agent, or Firm* — McDonald Hopkins LLC

(57) ABSTRACT

Provided is a battery including a case and a cap plate. The case is a cylindrical groove structure, a top end face, facing towards the case, of the cap plate is provided with an annular protrusion, the annular protrusion has a central axis coinciding with the central axis of the cap plate, an edge of the top end face of the cap plate is provided with a first welding platform face, the first welding platform face is arranged circumferentially around the annular protrusion, and an outer sidewall of the annular protrusion and the first welding platform face constitute a stepped face. The annular protrusion enters the interior of the case via an annular bottom end face of the case, and the annular bottom end face of the case is in contact with the first welding platform face and connected to the first welding platform face by laser welding.

14 Claims, 5 Drawing Sheets

(51) Int. Cl.
    *H01M 50/131*     (2021.01)
    *H01M 50/169*     (2021.01)
    *H01M 50/531*     (2021.01)
    *H01M 50/545*     (2021.01)

(56) References Cited

U.S. PATENT DOCUMENTS

2010/0136387 A1*   6/2010   Kohn ................ H01M 50/147
                                                                                            429/56
2023/0335868 A1*  10/2023   Wang ................ H01M 50/184

FOREIGN PATENT DOCUMENTS

| CN | 112151732 A | * | 12/2020 | ........ H01M 10/0583 |
|---|---|---|---|---|
| CN | 112290168 A | | 1/2021 | |
| CN | 113346201 A | | 9/2021 | |
| CN | 215578775 U | | 1/2022 | |
| CN | 216213942 U | | 4/2022 | |
| CN | 216354464 U | | 4/2022 | |
| KR | 20080034221 A | * | 4/2008 | .......... H01M 50/107 |
| WO | 2021068436 A1 | | 4/2021 | |

OTHER PUBLICATIONS

International Search Report mailed Jul. 29, 2022; International Patent Application No. PCT/2022/094102.
European Search Report for Application No. 22804063, dated Jan. 3, 2025, 8 pgs., European Patent Office, Germany.

\* cited by examiner

BATTERY

CROSS-REFERENCE TO RELATED APPLICATIONS

This application is a U.S. National Stage Application filed under 35 U.S.C. 371 of International Patent Application No. PCT/CN2022/094102 filed on May 20, 2022 which claims the priority of Chinese Patent Application No. 202121100856.8, filed with the Chinese Intellectual Property Administration on May 21, 2021, the disclosures of which are incorporated herein by reference in their entireties.

FIELD

The present application relates to the field of batteries, for example, to a battery.

BACKGROUND

The cylindrical lithium-ion battery in the related art is a cylindrical lithium-ion battery provided with a cap plate, and the connection of the cap plate to a case of the battery in assembling has a poor reliability, the cap plate has a risk of being cracked or disconnected when it is under certain conditions such as being subjected to vibration, pressure, therefore, there is a significant potential safety hazard.

SUMMARY

A battery is provided according to the present application, and the battery has high connecting strength between a cap plate and a case and excellent hermetic performance.

The following technical solution is adopted in the present application. A battery is provided, which includes a case and a cap plate. The case is a cylindrical groove structure, a top end face, facing towards the case, of the cap plate is provided with an annular protrusion, the annular protrusion has a central axis coinciding with the central axis of the cap plate, an edge of the top end face of the cap plate is provided with a first welding platform face, the first welding platform face is arranged circumferentially around the annular protrusion, and an outer sidewall of the annular protrusion and the first welding platform face constitute a stepped face. The annular protrusion enters the interior of the case via an annular bottom end face of the case, and the annular bottom end face of the case is in contact with the first welding platform face and connected to the first welding platform face by laser welding.

Figure 1:
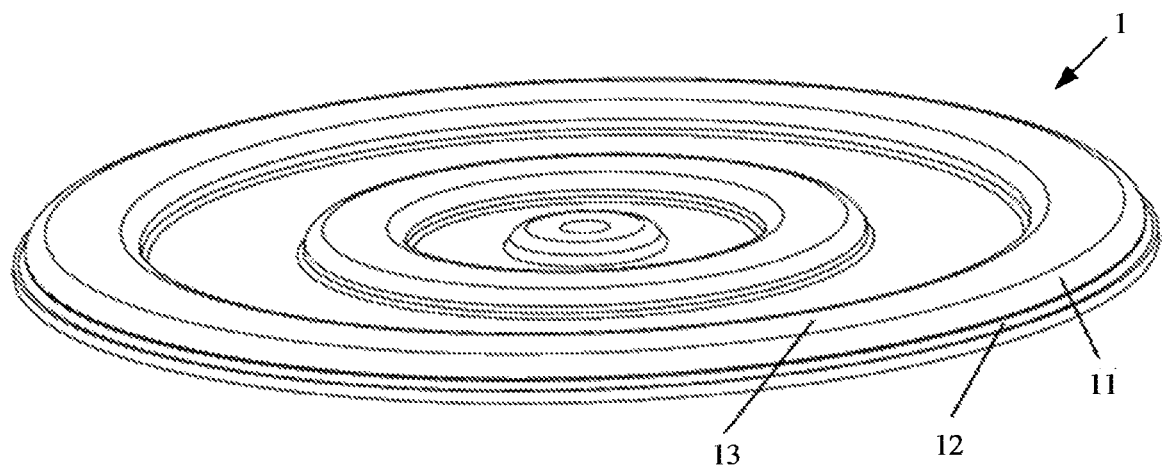
FIG. 1 is a schematic structural diagram of a cap plate according to an embodiment of the present application.
Figure 2:
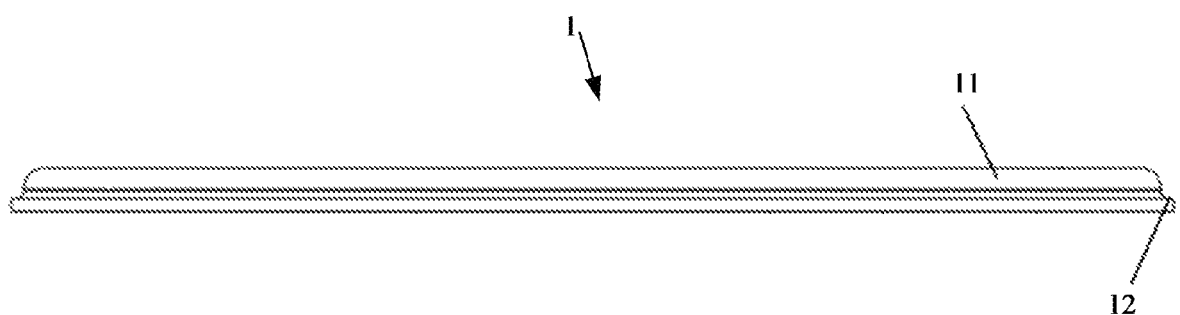
FIG. 2 is a front view of a cap plate according to an embodiment of the present application.
Figure 3:
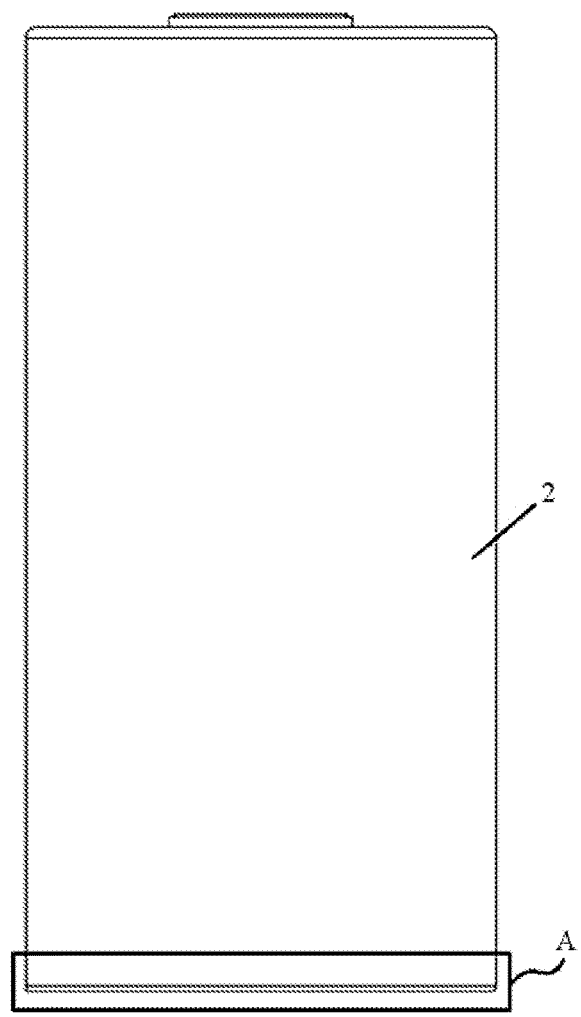
FIG. 3 is a schematic structural diagram of a battery according to an embodiment of the present application.
Figure 4:
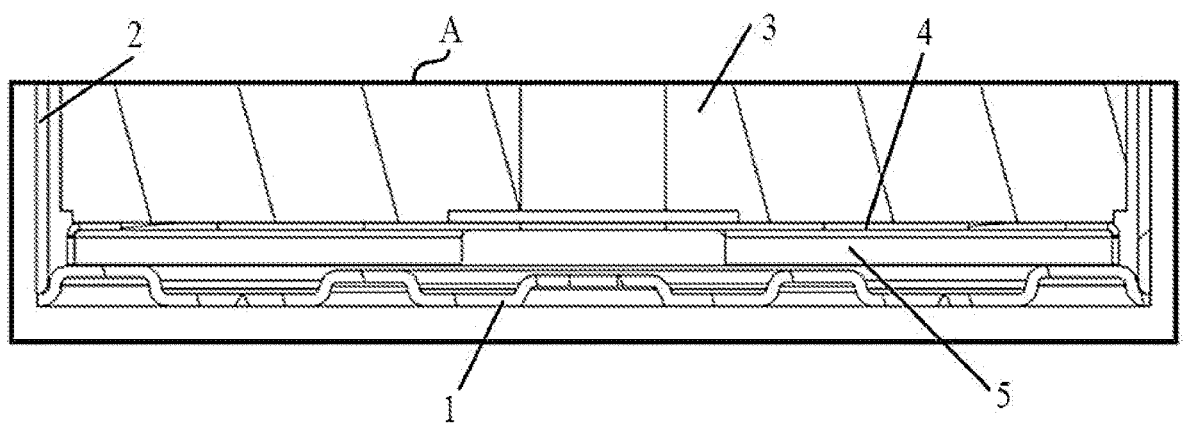
FIG. 4 is a sectional view of a part A in FIG. 3.

| Reference numerals in the drawings: | |
|---|---|
| 1. cap plate; | 11. annular protrusion; |
| 12. first welding platform face; | 13. second welding platform face; |
| 14. current collecting region; | 15. welding region; |
| 2. case; | 21. through hole; |
| 3. winding core; | 4. negative current collector; |
| 5. supporting block; | 6. positive terminal. |
| 7. positive current collector; and | 8. insulation sealing member. |

DETAILED DESCRIPTION

It is to be understood that the embodiments described herein are intended to illustrate rather than limiting the present application.

In the description of the application, it is to be appreciated that the orientation or position relationship indicated by terms such as "center", "longitudinal", "transverse", "length", "width", "thickness", "over", "below", "front", "back", "left", "right", "vertical", "horizontal", "top", "bottom", "inside", "outside", "clockwise" or "counterclockwise" is based on the orientation or position relationship shown in the drawings, which is only for the convenience of describing the present application and simplifying the description, rather than indicating or implying that the device or element referred to must have a specific orientation, be configured and operated in a specific orientation, so it cannot be understood as a limitation to the present application. Furthermore, the terms "first" and "second" are only used for description purposes and cannot be understood as indicating or implying relative importance or implicitly indicating the number of indicated technical features. Thus, the features defined as "first" and "second" can explicitly or implicitly include one or more of the described features. In the description of the present application, "multiple" means two or more, unless otherwise specifically defined.

In the description of the present application, it is to be noted that, unless otherwise expressly specified and limited, the terms "mounting", "connected to each other", "connected" are to be construed in a broad sense, for example, as permanently connected or detachably connected or integrally connected; mechanically connected; directly connected to each other or indirectly connected to each other via an intermediary; or internally connection of two components or interaction relationship between two components. For those of ordinary skill in the art, specific meanings of the preceding terms in the present application may be construed based on specific situations.

In the present application, unless otherwise expressly specified and limited, when a first feature is described as "above" or "below" a second feature, the first feature and the second feature may be in direct contact, or be in contact via another feature between the two features. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

As shown in FIG. 1 to FIG. 4, a battery with a novel structure according to an embodiment of the present application includes a case 2 and a cap plate 1, specifically, the case 2 is a cylindrical groove structure, a winding core 3 and a negative current collector 4 are arranged in the case 2, and an annular bottom end face of the case 2 is connected to a top end face, facing towards the case, of the cap plate 1 by laser welding. The cap plate 1 has a diameter equal to a maximum diameter of the case 2.

The top end face, facing towards the case 2, of the cap plate 1 is provided with an annular protrusion 11, and the annular protrusion 11 has a central axis coinciding with the central axis of the cap plate 1. An edge of the top end face, facing towards the case 2, of the cap plate 1 is provided with a first welding platform face 12, the first welding platform face 12 is arranged circumferentially around the annular protrusion 11, and an outer sidewall of the annular protrusion 11 and the first welding platform face 12 constitute a stepped face. When the cap plate 1 and the case 2 need to be connected, the annular protrusion 11 enters the interior of the case 2 via the annular bottom end face of the case 2, and an outer sidewall of the annular protrusion 11 comes into contact with an inner sidewall of the case 2.

When the cap plate 1 is connected to the case 2, the annular bottom end face of the case 2 is in contact with the first welding platform face 12 and is connected to the first welding platform face 12 by laser welding, so that the structure is firm and has a good hermetic performance.

A top end face of the annular protrusion 11 is provided with a second welding platform face 13, and an end face, remote from the cap plate 1, of the negative current collector 4 is connected to a negative electrode of the winding core 3. Four supporting blocks 5 are arranged between an end face, close to the cap plate 1, of the current collector 4 and the second welding platform face 13 of the annular protrusion 11, the four supporting blocks 5 are circumferentially distributed uniformly about the central axis of the cap plate 1, the supporting blocks 5 are made of a conductive material, and ends, remote from the negative current collector 4, of the supporting blocks 5 are connected to the second welding platform face 13 by welding.

Ends, remote from the cap plate 1, of the support blocks 5 are arranged integrally with the negative current collector 4.

The ends, remote from the cap plate 1, of the support blocks 5 are connected to the negative current collector 4 by welding.

The multiple technical features of the embodiments described above may be combined arbitrarily. For the sake of brevity, not all possible combinations of the multiple technical features of the embodiment described above are described. However, the combinations of these technical features should be considered to be within the scope of the present description as long as no contradictions exist in their combinations.

For the battery case in the related art, groove-rolling will be performed such that the negative current collector inside the case can be engaged and fixed. However, no groove-rolling process is needed for the case of the battery according to the present application, and for fixing the negative current collector, the top end face of the annular protrusion is provided with the second welding platform face. The end face, remote from the cap plate, of the negative current collector is connected to the negative electrode of the winding core, and the multiple supporting blocks are provided between the end face, close to the cap plate, of the negative current collector and the second welding platform face of the annular protrusion. The supporting blocks are made of a conductive material, the ends, remote from the negative current collector, of the supporting blocks are connected to the second welding platform face by welding, and another ends of the supporting blocks may be arranged integrally with the negative current collector or may be connected to the negative current collector by welding. The cap plate is rigidly connected to the negative current collector through the supporting blocks. A positive current collector, the winding core and the negative current collector arranged in a stacked manner are clamped between a groove bottom face of the case and the supporting blocks.

In an embodiment, when the cap plate and the case are in a connected state, the outer sidewall of the annular protrusion is in contact with the inner sidewall of the case, so that the annular protrusion can have functions of positioning and connection.

The present application provides a battery with a novel structure, the battery has high connecting strength between the cap plate and the case and good hermetic performance, and the case does not need to be subjected to the groove-rolling process resulted in internal space loss of the case, so that the utilization rate of the space inside the case is high, and the utilization rate of the space inside the case can be further improved by reducing the height of the supporting blocks. In another aspect, the negative current collector functions as both a sealing terminal, for sealing the opening of the tank, and a negative conductive terminal.

In an embodiment, the outer sidewall of the annular protrusion is connected to the inner sidewall of the case by laser welding.

In an embodiment, the battery further includes a winding core and a negative current collector, and the winding core and the negative current collector are located inside the case.

Figure 5:
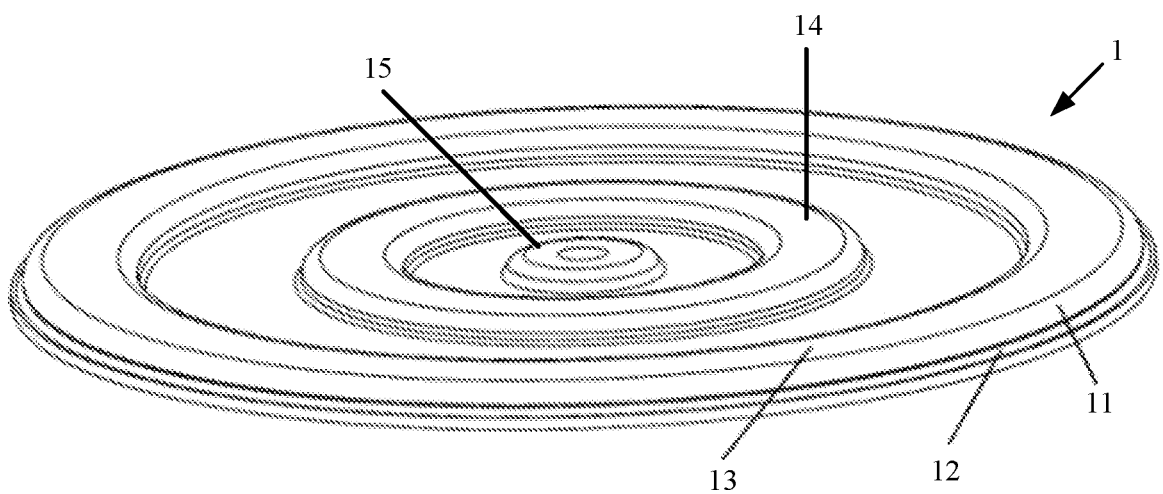
FIG. 5 is a schematic structural diagram of a cap plate according to another embodiment of the present application.

As shown in FIG. 5, in an embodiment, the cap plate includes a current collecting region 14 and a welding region 15, the current collecting region 14 is arranged to collect current of the winding core, and the welding region 15 is configured to be connected to the cap plate by welding. The current collecting region 14 is an annular protrusion region provided on the top end face, facing towards the case, of the cap plate, and the current collecting region 14 has a central axis coinciding with the central axis of the cap plate, and is arranged to be electrically connected to the negative collector current of the case inside. The welding region 15 is another annular protrusion region provided on the top end face, facing towards the case, of the cap plate, and the welding region 15 has a central axis also coinciding with the central axis of the cap plate, and is configured for welding the battery to seal the battery.

In an embodiment, the negative current collector is a planar structure or a stereoscopic structure, for example, a circular planar structure or an irregular stereoscopic structure, and the negative current collector is configured to collect current of the winding core and achieve electrical connection to the cap plate.

In an embodiment, the height of the annular protrusion ranges from 0.1 mm to 3 mm.

In an embodiment, the annular protrusion has a diameter smaller than an inner diameter of the case by 0.05 mm to 0.2 mm. There is an assembling relationship between the annular protrusion and the case, such an arrangement facilitates the assembling and flowing of the melted substance in welding. An inclination face, in contact with the case, of the annular protrusion may have an inclination angle ranging from 1° to 5°.

In an embodiment, 1<(Height of the annular protrusion)/(Thickness of the cap plate)<2.

In an embodiment, the case includes a cylindrical barrel and a groove structure located at the top of the case, and the groove structure is annular-shaped.

Figure 6:
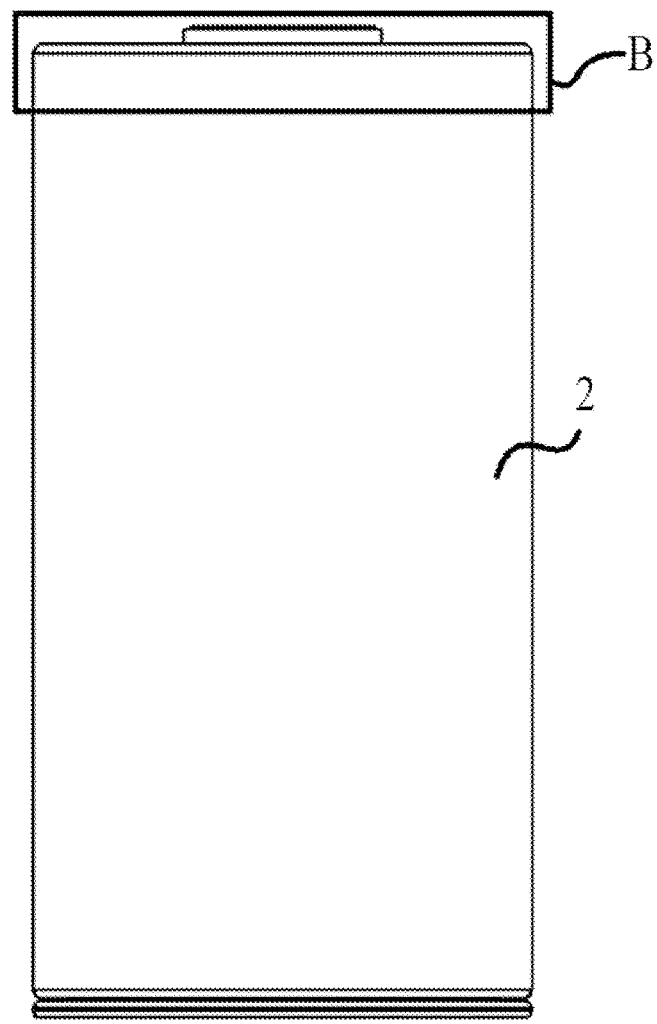
FIG. 6 is a front view of a cylindrical battery according to an embodiment of the present application.
Figure 7:
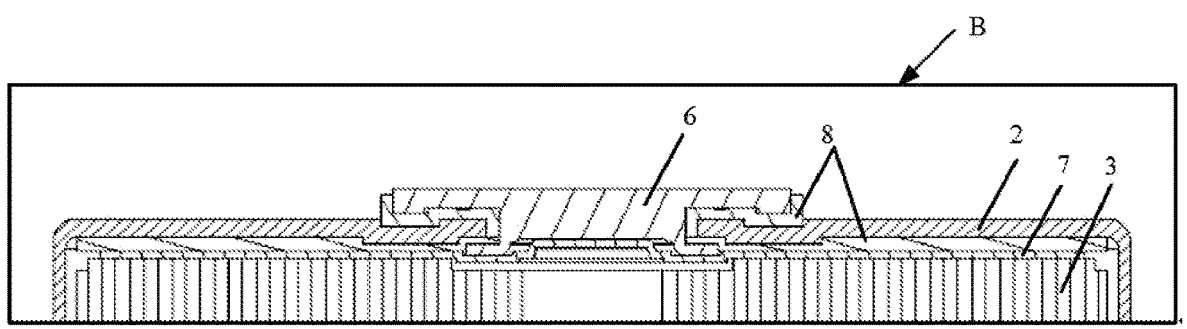
FIG. 7 is a sectional view of a part B in FIG. 6.
Figure 8:
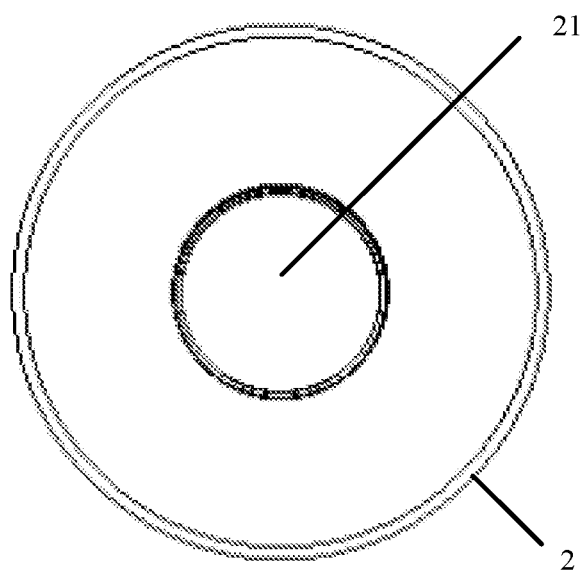
FIG. 8 is a top view of a case according to an embodiment of the present application.

As shown in FIG. 6 to FIG. 8, in an embodiment, the battery further includes a positive terminal 6 and an insulation sealing member 8, the top of the case is provided with a through hole 21, the through hole 21 is configured for mounting the positive terminal 6 and the insulation sealing member 8, and the through hole 21 has a central axis coinciding with the central axis of the cap plate. Thus, the central region of the top of the case is the positive terminal 6, and the positive terminal 6 and the negative region are located at a same side of the top of the case.

In an embodiment, the battery further includes a positive current collector 7, the positive current collector 7 is electrically connected to the positive terminal 6, and the negative current collector is electrically connected to the cap plate. The annular bottom end face of the case is fitted with a peripheral region of the annular protrusion of the cap plate, and the cap plate is connected to the case in a sealed manner by laser welding, thus, the assembly of the battery is completed.

In an embodiment, the height of the battery ranges from 80 mm to 130 mm and the height of a protruding portion of the positive terminal 6 ranges from 1 mm to 3 mm.

In an embodiment, the diameter of the battery may be 46 mm.

What is claimed is:

1. A battery, comprising a case and a cap plate, wherein the case is a cylindrical groove structure, a top end face, facing towards the case, of the cap plate is provided with an annular protrusion, the annular protrusion has a central axis coinciding with the central axis of the cap plate, an edge of the top end face of the cap plate is provided with a first welding platform face, the first welding platform face is arranged circumferentially around the annular protrusion, an outer sidewall of the annular protrusion and the first welding platform face constitute a stepped face, the annular protrusion enters an interior of the case via an annular bottom end face of the case, and the annular bottom end face of the case is in contact with the first welding platform face and connected to the first welding platform face by laser welding;

wherein a top end face of the annular protrusion is provided with a second welding platform face;

the battery further comprises a winding core and a negative current collector, and the winding core and the negative current collector are located inside the case; and an end face, remote from the cap plate, of the negative current collector is connected to a negative electrode of the winding core, supporting blocks are arranged between an end face, close to the cap plate, of the current collector and the second welding platform face, and ends, remote from the negative current collector, of the supporting blocks are connected to the second welding platform face by welding.

2. The battery according to claim 1, wherein the outer sidewall of the annular protrusion is in contact with an inner sidewall of the case.

3. The battery according to claim 2, wherein the outer sidewall of the annular protrusion is connected to the inner sidewall of the case by laser welding.

4. The battery according to claim 1, wherein ends, remote from the cap plate, of the supporting blocks are arranged integrally with the negative current collector.

5. The battery according to claim 1, wherein the ends, remote from the cap plate, of the supporting blocks are connected to the negative current collector by welding.

6. The battery according to claim 1, wherein the cap plate comprises a current collecting region and a welding region, the current collecting region is arranged to collect current of the winding core, and the welding region is arranged to be connected to the cap plate by welding.

7. The battery according to claim 6, wherein the negative current collector is a planar structure or a stereoscopic structure.

8. The battery according to claim 1, wherein the annular protrusion has a height ranging from 0.1 mm to 3 mm.

9. The battery according to claim 1, wherein the annular protrusion has a diameter smaller than an inner diameter of the case by 0.05 mm to 0.2 mm.

10. The battery according to claim 1, wherein 1<(Height of the annular protrusion)/(Thickness of the cap plate)<2.

11. The battery according to claim 1, wherein the case comprises a cylindrical barrel and a groove structure located at a top of the case, and the groove structure is annular-shaped.

12. The battery according to claim 1, further comprising a positive terminal and an insulation sealing member, wherein the top of the case is provided with a through hole, the through hole is configured for mounting the positive terminal and the insulation sealing member, and the through hole has a central axis coinciding with the central axis of the cap plate.

13. The battery according to claim 12, further comprising a positive current collector, wherein the positive current collector is electrically connected to the positive terminal, and the negative current collector is electrically connected to the cap plate.

14. The battery according to claim 12, wherein the battery has a height ranging from 80 mm to 130 mm and a protruding portion of the positive terminal has a height ranging from 1 mm to 3 mm.

* * * * *